United States Patent
DeChard

(10) Patent No.: US 11,179,753 B2
(45) Date of Patent: *Nov. 23, 2021

(54) WASTE AND/OR HAZARDOUS LIQUID CONTAINMENT AND COLLECTION SYSTEM

(71) Applicant: Albert DeChard, Tampa, FL (US)

(72) Inventor: Albert DeChard, Tampa, FL (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/832,252

(22) Filed: Mar. 27, 2020

(65) Prior Publication Data

US 2020/0246844 A1 Aug. 6, 2020

Related U.S. Application Data

(63) Continuation-in-part of application No. 16/205,462, filed on Nov. 30, 2018, now Pat. No. 10,640,398.

(Continued)

(51) Int. Cl.
*B08B 3/14* (2006.01)
*C02F 1/00* (2006.01)
*C02F 1/40* (2006.01)
*C02F 1/44* (2006.01)

(Continued)

(52) U.S. Cl.
CPC ................. *B08B 3/14* (2013.01); *A01G 7/06* (2013.01); *B01D 61/025* (2013.01); *B01D 61/08* (2013.01); *B32B 5/26* (2013.01); *C02F 1/001* (2013.01); *C02F 1/40* (2013.01); *C02F 1/441* (2013.01); *B01D 2311/2642* (2013.01); *B01D 2311/2649* (2013.01); *B60S 3/044* (2013.01);

(Continued)

(58) Field of Classification Search
CPC . B08B 3/14; B08B 17/025; B32B 5/26; C02F 1/001; C02F 1/40; C02F 1/441; C02F 2103/26; C02F 2103/44; C02F 2001/007; C02F 2303/16; C02F 2101/32; B01D 61/025; B01D 61/08; B01D 2311/2642; B01D 2311/2649; A01G 7/06; B60S 3/044; B60S 3/04
See application file for complete search history.

(56) References Cited

U.S. PATENT DOCUMENTS 1,764,756 A 6/1930 Slee
3,555,224 A 1/1971 Frind
(Continued)

FOREIGN PATENT DOCUMENTS

GB 2483690 A 3/2012

*Primary Examiner* — Liam Royce
(74) *Attorney, Agent, or Firm* — Larson & Larson, P.A.; Frank Liebenow; Justin P. Miller

(57) ABSTRACT

A liquid cleaning system for living plants rests on a surface covered by a non-porous material. A plate layer covering the non-porous layer has two or more layers, each layer having runners arranged in a grid. The grid of each successive layer is offset at an angle with respect to the grid of a previous layer. An upper layer covers the plate layer and has a plurality of holes for the passage of liquids into the liquid cleaning system. As the living plants are watered or cleaned, excess liquids containing water and oils that were excreted by the living plants enter the liquid cleaning system through the holes, the liquid traverses the grid layers, flowing towards a drain. Contaminants within the liquid collect within the grid of the layers of the plate layer for later disposal.

13 Claims, 10 Drawing Sheets

Related U.S. Application Data which is a continuation-in-part of application No. 15/454,575, filed on Mar. 9, 2017, now Pat. No. 10,174,493, which is a continuation-in-part of application No. 14/615,711, filed on Feb. 6, 2015, now Pat. No. 9,630,860.

(51) Int. Cl.
*B01D 61/02* (2006.01)
*B01D 61/08* (2006.01)
*A01G 7/06* (2006.01)
*B32B 5/26* (2006.01)
*B60S 3/04* (2006.01)
*C02F 101/32* (2006.01)
*C02F 103/44* (2006.01)
*C02F 103/26* (2006.01)

(52) U.S. Cl.
CPC .... *C02F 2001/007* (2013.01); *C02F 2101/32* (2013.01); *C02F 2103/26* (2013.01); *C02F 2103/44* (2013.01); *C02F 2303/16* (2013.01)

(56) References Cited

U.S. PATENT DOCUMENTS

| | | | |
|---|---|---|---|
| 4,156,621 A * | 5/1979 | Andrews | B01D 61/025 134/10 |
| 4,240,944 A | 12/1980 | Temple | |
| 4,815,892 A | 3/1989 | Martin | |
| 5,221,570 A | 6/1993 | Gokcen et al. | |
| 5,411,665 A | 5/1995 | Scraggs et al. | |
| 5,601,906 A * | 2/1997 | Henry | B32B 27/02 442/1 |
| 5,738,139 A | 4/1998 | DeChard | |
| 5,976,225 A | 11/1999 | Nystrom | |
| 7,290,558 B2 | 11/2007 | DeChard et al. | |
| 8,109,696 B2 | 2/2012 | Maggioni | |
| 2005/0025582 A1 | 2/2005 | Ianniello | |
| 2007/0044839 A1 | 3/2007 | DeChard | |
| 2012/0063854 A1* | 3/2012 | Ayers | B09C 1/005 405/302.6 |

\* cited by examiner

WASTE AND/OR HAZARDOUS LIQUID CONTAINMENT AND COLLECTION SYSTEM

CROSS-REFERENCE TO RELATED APPLICATION

This application is a continuation in part of U.S. patent application Ser. No. 16/205,462, filed Nov. 30, 2018; which is a continuation in part of U.S. patent application Ser. No. 15/454,575, filed Mar. 9, 2017, now U.S. Pat. No. 10,174,493 issued Jan. 8, 2019; which, in turn, is a continuation in part of U.S. patent application Ser. No. 14/615,711, filed Feb. 6, 2015, now U.S. Pat. No. 9,630,860 issued Apr. 25, 2017, the disclosure of which are hereby incorporated by reference.

FIELD

The present invention relates to hazardous and/or waste liquid collection and containment. More particularly, it relates to a modular cleaning system for capturing, containing and collecting hazardous liquids and/or waste water, for example, resulting from cleaning of vehicles or runoff from a growing facility.

BACKGROUND

Hazardous liquid and waste water collection is known in the prior art. Due to rising concerns that the environment is becoming polluted at an alarming rate and the mandate of the federal Clean Water Act by, governments, both State and Federal, and those in other countries have begun mandating that water runoff from many vehicle washing procedures be contained and collected for proper disposable to avoid further contamination of the environment. For example, the simple process of cleaning a piece of machinery in which oils are separated from the machinery must now be cleaned, in many locales, in a controlled rinsing facility or shower system that collects and contains the water used during the cleaning procedure. The waste water is generally not permitted to simply enter the sewer system or runoff into the underground aquifer or nearest body of water. In many locations, the washing of vehicles such as trucks and automobiles requires that the rinse water be captured, contained and disposed of properly.

Other cleaning problems occur with hazardous liquid and waste water containment and collection. In particular, it is possible for businesses, public facilities and land areas to be exposed to or infected with deadly biological or chemical substances that are extremely hazardous to remove. During an exemplary cleaning procedure, the people involved must wear protective suits. When finished in the cleaning operation, the protective wear must be thoroughly cleansed before being removed. However, it is not permitted to allow the rinse water to simply runoff and into ground or sewer.

In one particular operation, indoor growing of certain medicinal plants, water and nutrients provided to these plants often reaches the floor of the growing facility. As the water that reaches the floor often contains soil particles, fertilizers, and possible contamination from the plants that are being grown, such facilities are not permitted to allow this contaminated water to flow into drain/storm systems or to reach ground water tables. Further, second to electricity, water for such plants is an expensive portion of the costs of growing such plants. Therefore, there is a need to capture such runoff water and contaminates and to clean the runoff water for use in watering these plants.

U.S. Pat. No. 7,290,558 to DeChard et al, which is hereby incorporated by reference, shows a mobile waste and containment system that lacks multiple layers of corrugated membranes as will be described.

What is needed is a system that will collect contaminated liquids (e.g. water and other soluble or insoluble material) and separate the undesirable materials from the liquid (e.g., water) for proper disposal of the undesirable materials and reuse of the water.

SUMMARY

In one embodiment, a liquid cleaning system for living plants is disclosed including a planar material beneath the living plants; the planar material being non-porous material except for a drain. Resting upon the non-porous material is a plate layer that has at least two layers of runners arranged in a grid. The grid of each successive layer of the layers is offset at an angle with respect to the grid of a previous layer of the layers. An upper layer covers the plate layer and has a plurality of holes for passing a liquid therethrough. As the living plants are watered or cleaned using the liquid, the liquid and contaminants enters the liquid cleaning system through the plurality of holes, traverses the grid of the layers of the plate layer and flows towards the drain, and contaminants within the liquid collect within the grids of the layers of the plate layer.

In another embodiment, a method of cleaning living plants is disclosed including spraying the plants with a liquid and collecting the liquid by passing the liquid through holes in an upper layer of a cleaning system, thereby filtering out larger particles from the liquid. After entering the holes, the liquid traverses a plate layer of the cleaning system before reaching a drain in a lower layer of the cleaning system, the lower layer being non-porous except for the drain. The plate layer includes layers of runners arranged in a grid and the grid of each successive layer of the layers is offset at an angle with respect to the grid of a previous layer of the layers, thereby the liquid traversing the layers of the plate layer must traverse the grids of layers. Any oils from the living plants that are suspended in the liquid accumulate within the grids of layers of the plate layer.

In another embodiment, a liquid cleaning system positioned beneath living plants is disclosed including a lower layer that is substantially non-porous except for a drain above which there is a plate layer comprising at least two layers of runners arranged in a grid. The grid of each successive layer of the layers is offset at an angle with respect to the grid of a previous layer of the layers. There is an upper layer covering the plate layer, the upper layer has a plurality of holes for the passage of fluids. Walls surround the plate layer and the upper layer.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
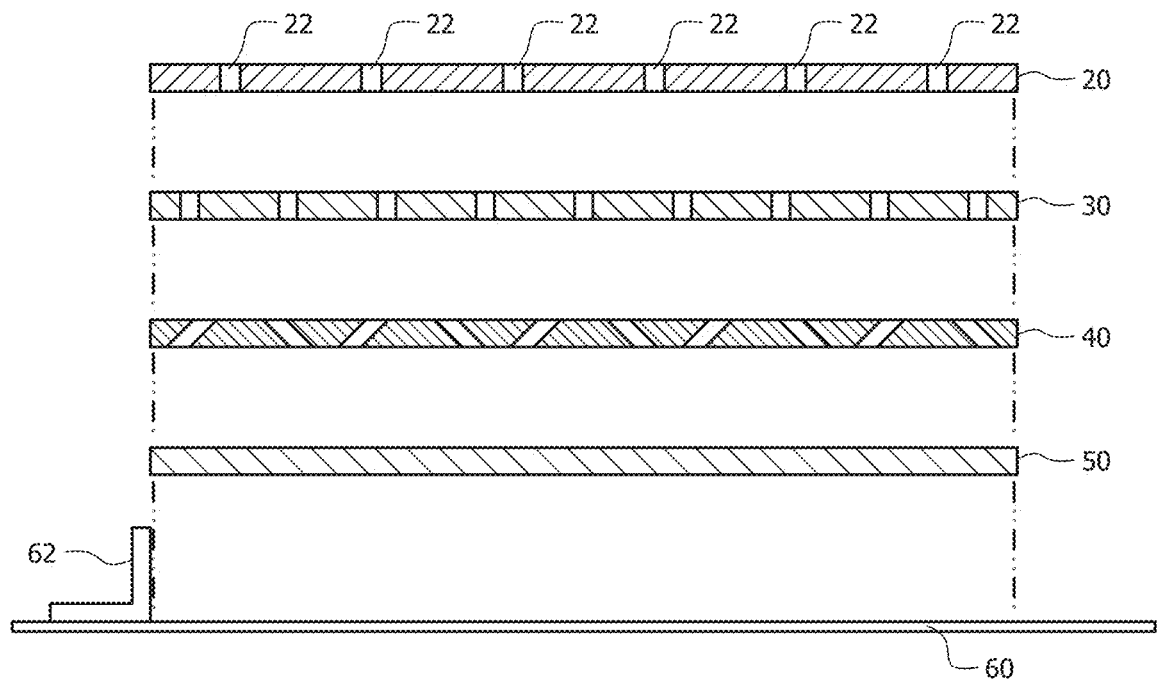
FIG. 1 illustrates a cross-sectional view of a separation portion of a waste and/or hazardous liquid containment and collection system.

Reference will now be made in detail to the presently preferred embodiments of the invention, examples of which are illustrated in the accompanying drawings. Throughout the following detailed description, the same reference numerals refer to the same elements in all figures.

Although the disclosed invention is shown in use for vehicle cleaning as an example, the system disclose is capable of separating and proper disposal of liquids from many different applications such as indoor plant growing facilities. The disclosed invention is not limited to washing vehicles.

Figure 1A:
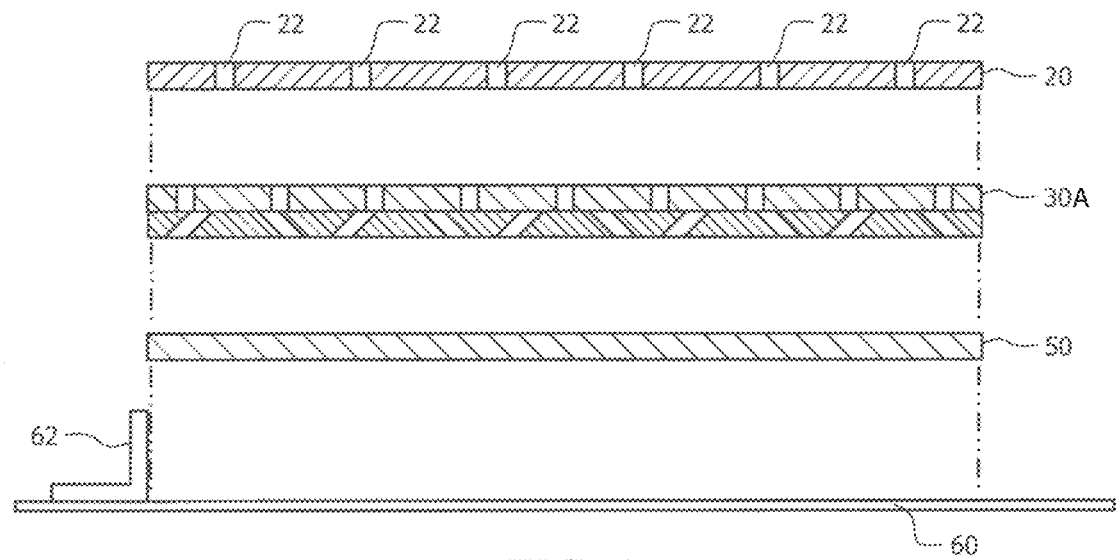
FIG. 1A illustrates a second cross-sectional view of a separation portion of a waste and/or hazardous liquid containment and collection system.
Figure 2:
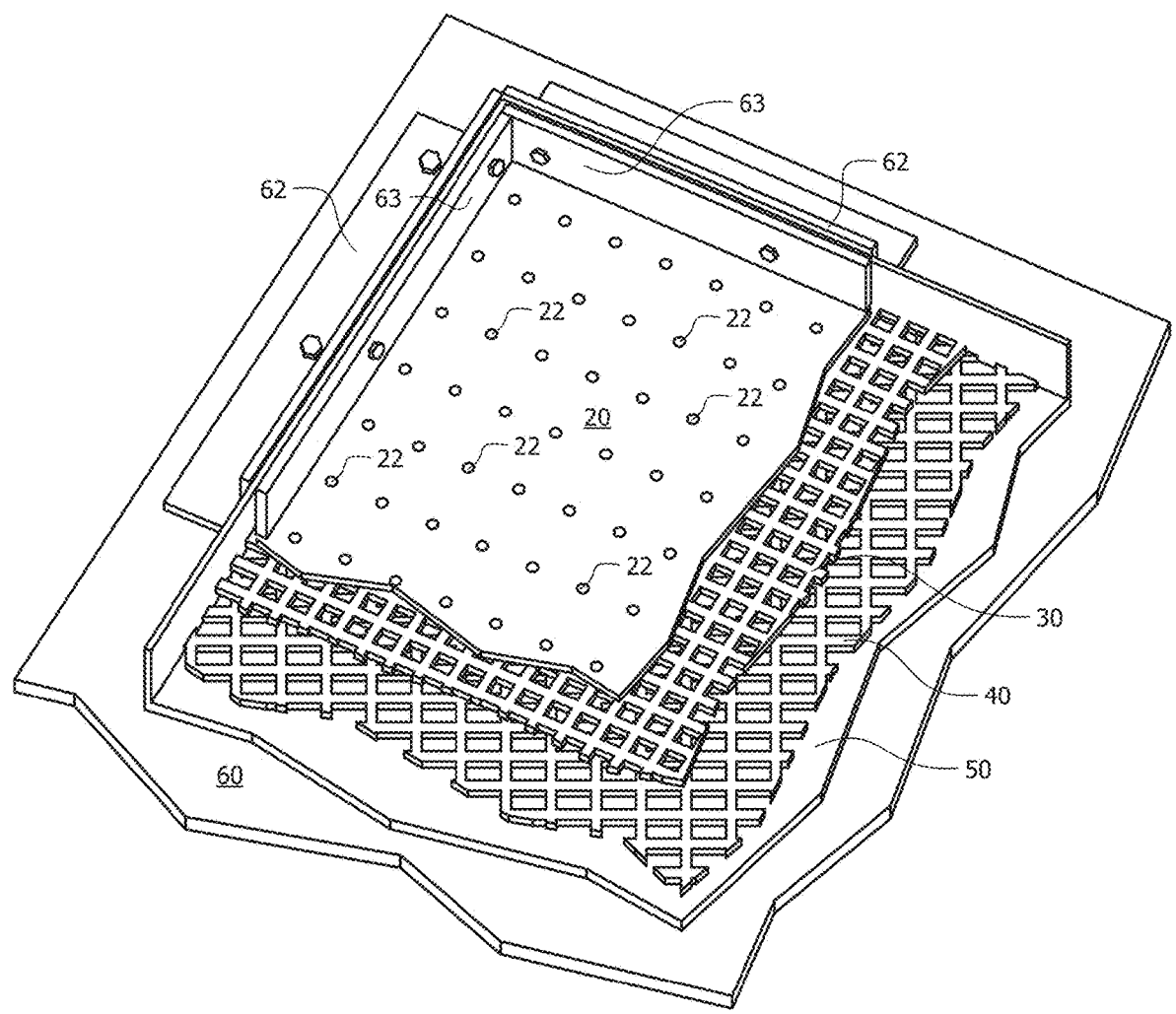
FIG. 2 illustrates a cut-away view of the separation portion of the waste and/or hazardous liquid containment and collection system.

Referring to FIGS. 1, 1A, and 2, cross-sectional and cut-away views of a separation portion of a waste and/or hazardous liquid containment and collection system are shown.

In the process of washing machinery such as vehicles, various chemicals and oils are dislodged from the machinery or vehicles such as gasoline, oils, salts, car wax, tar, etc. Many municipalities prohibit drain water from machinery cleaning or car washes to enter the sewerage and/or drain water system, as these chemicals and oils would then find their way to rivers, streams, and other bodies of water, adding pollutants to such. On the other hand, it is desirable by many to have a clean vehicle, especially in geographies where ice and snow removal include using salts to melt the ice and snow being that such salts are corrosive in nature. Many people like to have clean vehicles and, to enhance the salability of vehicles; automobile dealerships often wash the entire inventory of vehicles on a periodic interval to assure that the fleet of vehicles is appealing to potential buyers.

Many people wash their vehicles at home, in their driveway, using a garden hose and bucket, releasing small amounts of pollutants into the storm drain system, which eventually leads to the above mentioned bodies of water. Many others wash their vehicles in car wash facilities which typically have bays equipped with a high pressure source of water/soap and a drain to wash away excess water and dirt. Washing of vehicles in car wash facilities is preferred, in that, it is more cost-effective to process the contaminated water from the washing process than processing the contaminated water at everybody's home.

In addition to cleaning of the waste water, some localities with limited average rainfall and many localities during drought conditions, prohibit washing of vehicles at homes and offices. In such, car washing facilities are required to recycle water so as to use as little as possible. As one could imagine, it is not good to wash a vehicle with unfiltered water from previous washed vehicles. Using such contaminated water results in a dirty vehicle, even after cleaning. Using contaminated water also results in fine grain grit being power-sprayed onto the vehicle which, besides slowly removing waxes and paint from the vehicle, this grit also clogs the high-pressure spray nozzle, requiring frequent cleaning or replacement of the nozzle.

Figure 4:
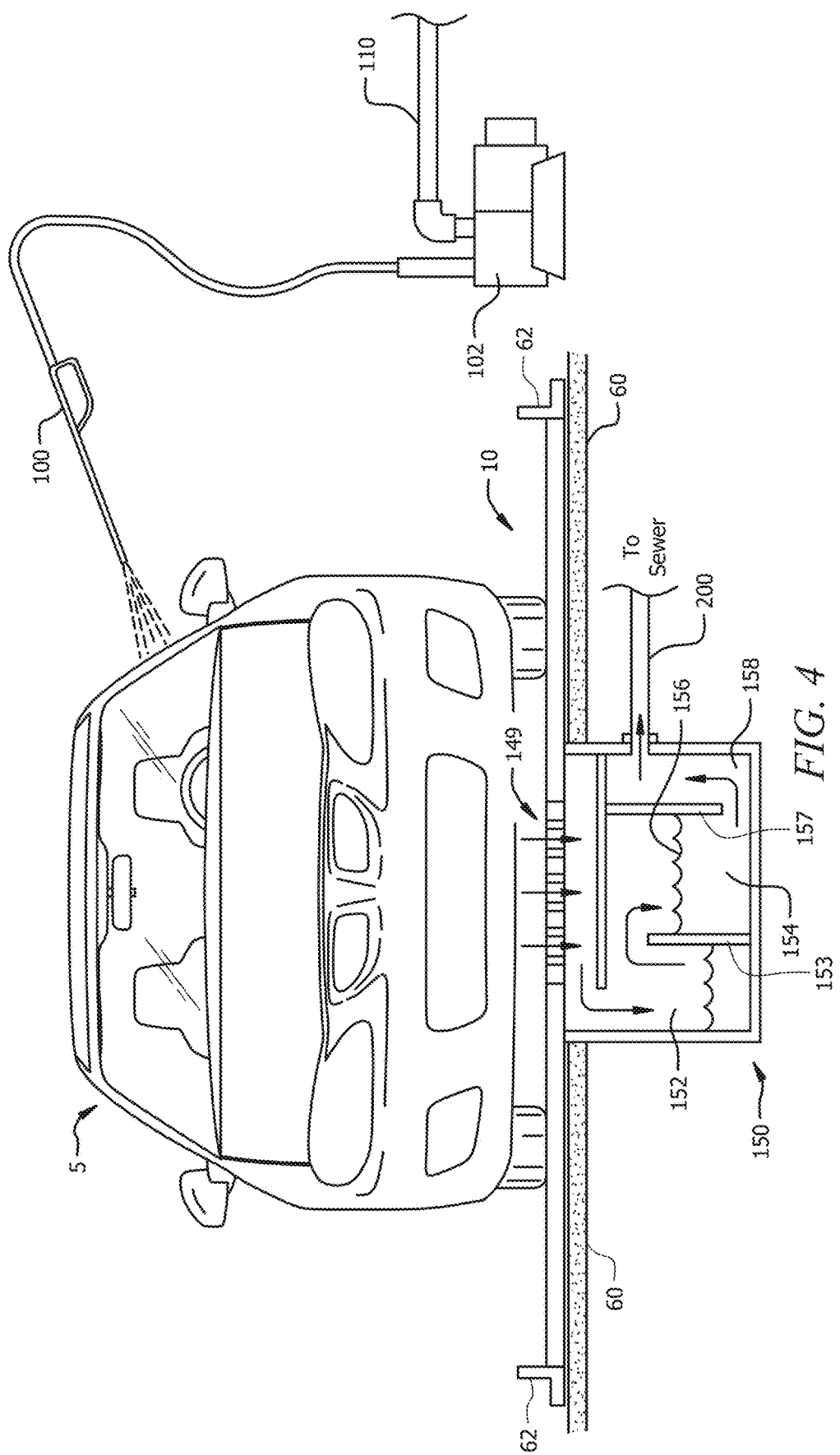
FIG. 4 illustrates a cut-away view of the weir system of the waste and/or hazardous liquid containment and collection system.
Figure 5:
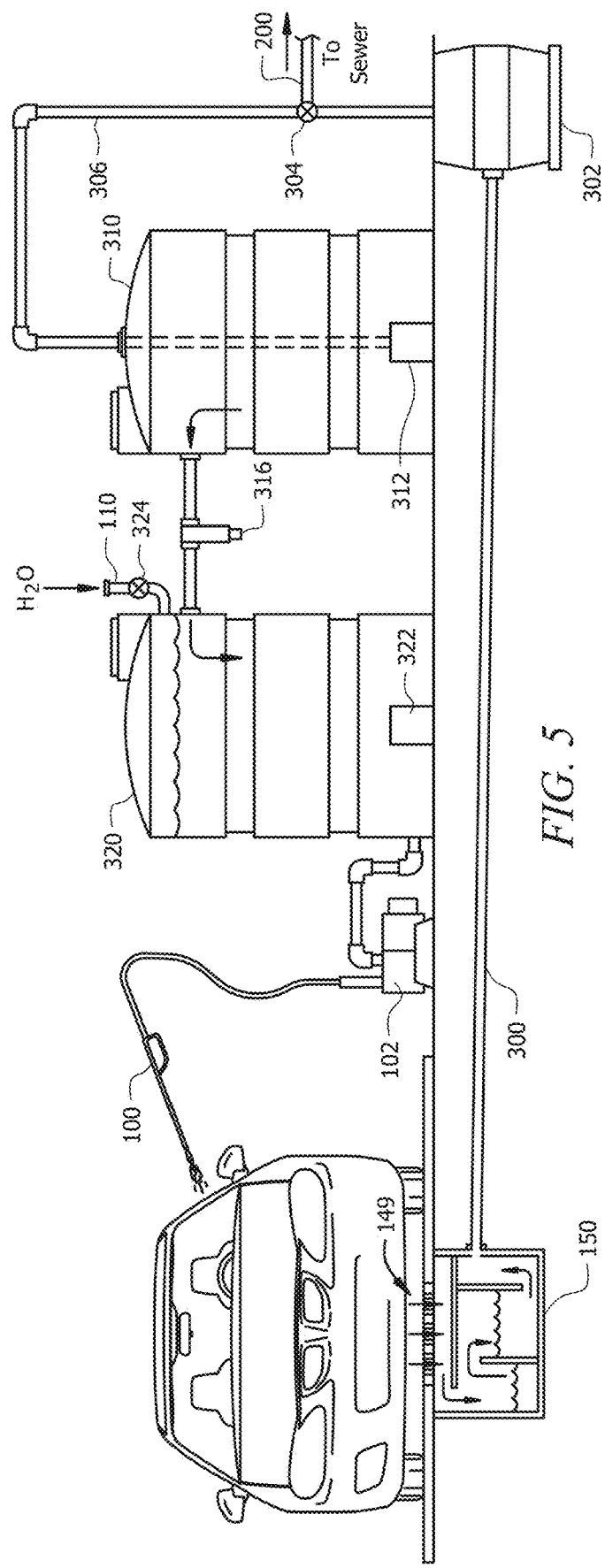
FIG. 5 illustrates a third elevational view of the waste and/or hazardous liquid containment and collection system.
Figure 6:
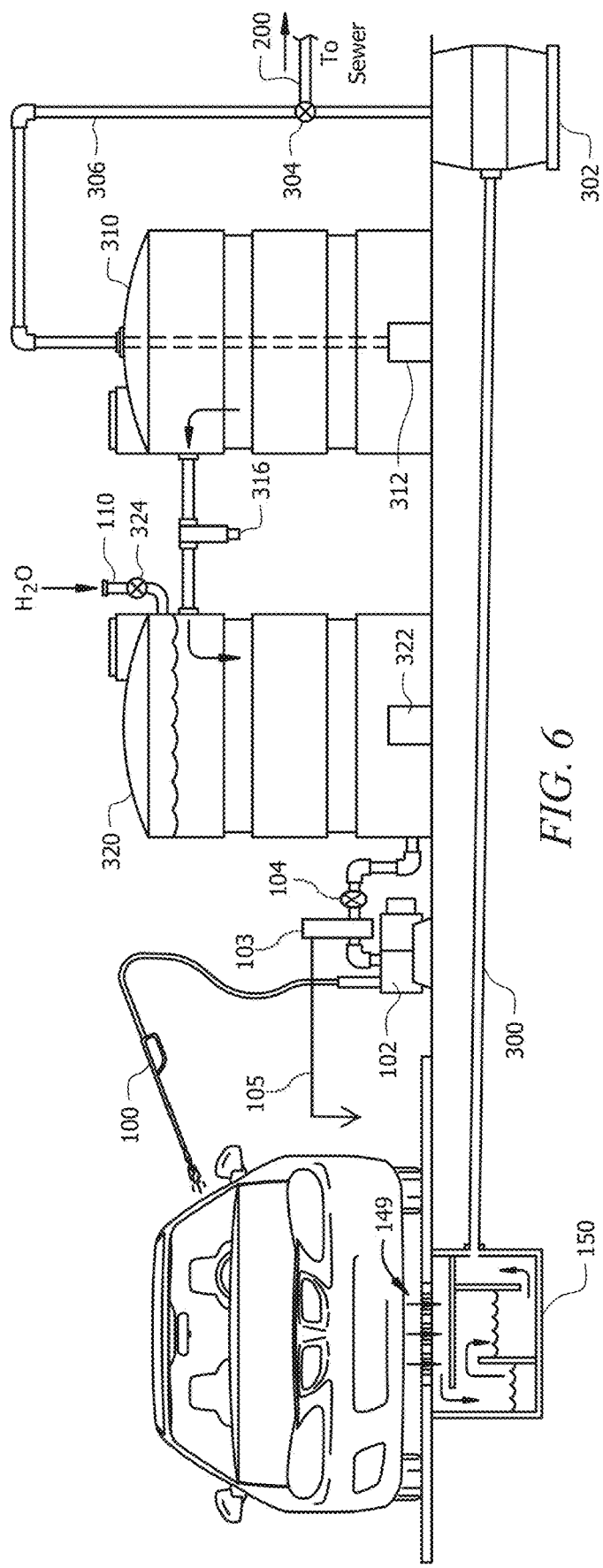
FIG. 6 illustrates a fourth elevational view of the waste and/or hazardous liquid containment and collection system.

To facilitate recycling of the waste water from the above described situations, the disclosed waste and/or hazardous liquid containment and collection system includes one or more separation and/or filtering portions, each independent of the other and useful with or without the others. The first such separation and/or filter section is shown in FIG. 1. This separation portion includes several layers 20/30/40/50. The layers 20/30/40 that are permeable are held atop the base layer 50 by wall members 62 that prevent the contaminated liquids from spilling out from the sides of the layers 20/30/40/50. In some embodiments, the base layer 50 is a water resistant coating on the ground surface 60 (e.g. waterproof paint, sealer, etc.) Although not required, it is anticipated that, in some embodiments, the wall members 62 are fastened to the ground surface 60 (e.g. a cement slab). In some embodiments, plates 63 are fastened to the wall members 62 to secure the layers 20/30/40/50 in place. In a preferred embodiment, the bottom, base layer 50 includes drainage for recycling runoff as shown in FIGS. 4, 5, and 6. Also, although not required, in this preferred embodiment, it is also preferred that there is a slow pitch or incline angled downward with respect to gravity, converging at the drain 149 (see FIGS. 4, 5, and 6).

As contaminated fluids with solids (e.g. water, solids, and pollutants) fall onto the upper layer 20, the contaminated fluids pass through a plurality of holes 22 in the upper layer 20, filtering out large debris such as stones, paper, etc.

The next two layers are plate layers 30/40 are made of geo-membranes or membranes arranged in a grids or similar geometric pattern. The upper plate layer 30 is set over the lower plate layer 40. In a preferred embodiment, the upper plate layer 30 is offset at an angle with respect to the lower plate layer 40. Although any angle is anticipated, an example of one angle is 45 degrees, in that, lines of the grid of the upper plate layer 30 are at 45 degree angles with respect to lines of the grid of the lower plate layer 40. By arranging the plate layers 30/40 in this offset angle, as shown in FIG. 2, on top of the base layer 50, contaminated water with suspended oils must traverse the plate layers 30/40 to reach the drain. As the contaminated water with suspended oils traverses the plate layers 30/40, oil droplets (the leading pollutant) are forced to increase in size, thereby speeding separation from other liquids such as water. As the contaminated water with suspended oils enters the plate layers 30/40, the contaminated water with suspended oils flow towards the drain, e.g. by a slight incline. The contaminated water with suspended oils must traverse the plate layers 30/40. As the contaminated water with suspended oils goes over runners of the lower plate layer 40, pollutants that have a higher specific gravity than water remain within the grid of the lower plate layer 40 and as the fluid goes under runners of the upper plate layer 30, pollutants that have lower specific gravity than water remain within the grid of the upper plate layer 30, thereby filtering out much of the pollutants before they reach the drain 149.

After some number of uses, the upper layer 20 is lifted and the oil is vacuumed out of the plate layers 30/40 for proper disposal and recycling.

As an example, the plate layers 30/40 are textured geo-membranes made by co-extruding textured, high density polyethylene providing chemical resistance and sufficient load carrying abilities to support the weight of most vehicles.

A slightly modified separation and/or filter section is shown in FIG. 1A. This separation portion includes several layers 20/30A/50. The layers 20/30A that are permeable are held atop the base layer 50 by wall members 62 that prevent the contaminated liquids from spilling out from the sides of the layers 20/30A/50. In some embodiments, the base layer 50 is a water resistant coating on the ground surface 60 (e.g. waterproof paint, sealer, etc.) Although not required, it is anticipated that, in some embodiments, the wall members 62 are fastened to the ground surface 60 (e.g. a cement slab). In some embodiments, plates 63 are fastened to the wall members 62 to secure the layers 20/30A/50 in place. In a preferred embodiment, the bottom, base layer 50 includes drainage for recycling runoff as shown in FIGS. 4 and 5. Also, although not required, in this preferred embodiment, it is also preferred that there is a slow pitch or incline angled downward with respect to gravity, converging at the drain 149 (see FIGS. 4 and 5).

As contaminated fluids with solids (e.g. water, solids, and pollutants) fall onto the upper layer 20, the contaminated fluids pass through a plurality of holes 22 in the upper layer 20, filtering out large debris such as stones, paper, etc.

The next layer is a plate layer 30A made of geo-membranes or membranes arranged in a grids or similar geometric pattern. The plate layer 30A is manufactured with grid layers (any number of two or more grid layers) that are offset to each other at an angle with respect to the subsequent grid layer. Although any angle is anticipated, an example of one angle is 45 degrees, in that, the grid of a first layer of the plate layer 30A is offset at a 45 degree angle with respect to a grid of a second layer of the plate layer 30A. By arranging the layers in this offset angle, as shown in FIG. 2, contaminated water with suspended oils must traverse the layers of the plate layer 30A to reach the drain. As the contaminated water with suspended oils traverses the layers of the plate layer 30A, oil droplets (the leading pollutant) are forced to increase in size, thereby speeding separation from other liquids such as water. As the contaminated water with suspended oils enters the layers of the plate layer 30A, the contaminated water with suspended oils flow towards the drain, e.g. by a slight incline. The contaminated water with suspended oils must traverse the layers of the plate layer 30A. As the contaminated water with suspended oils goes over runners of a lower layer of the plate layer 30A, pollutants that have a higher specific gravity than water remain within the grid of the lower layer of the plate layer 30A and as the fluid goes under runners of the upper layer of the plate layer 30A, pollutants that have lower specific gravity than water remain within the grid of the upper layer of the plate layer 30A, thereby filtering out much of the pollutants before they reach the drain 149.

After some number of uses, the upper layer 20 is lifted and the oil/pollutants is vacuumed out of the plate layer 30A for proper disposal and recycling.

As an example, the plate layer 30A is fabricated as multiple layers of textured geo-membranes made by molding or co-extruding textured, high density polyethylene providing chemical resistance and sufficient load carrying abilities to support the weight of most vehicles.

Any base layer 50 is anticipated such as a reinforced polypropylene as known for use as a liner for containment ponds (with drain 149).

Figure 3:
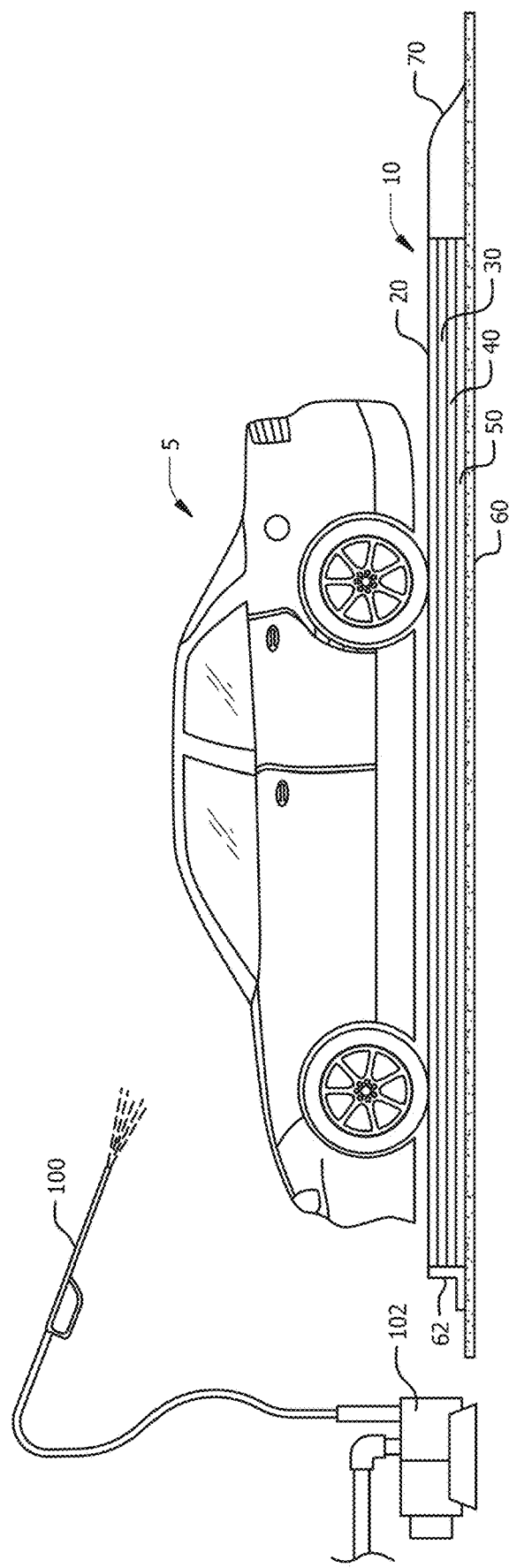
FIG. 3 illustrates an elevational view of the waste and/or hazardous liquid containment and collection system.

Referring to FIG. 3, a plan view of the waste and/or hazardous liquid containment and collection system 10 is shown. In this example, a ramp 70 is provided to ease driving of a vehicle 5 onto the collection system 10. For completeness, a high-pressure pump 102 and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30/40/50. As the contaminated water flows traverses the plate layers 30/40, any oil suspended in the water beads into droplets that further combine with existing droplets of oil and remains within the netting of the plate layers 30/40 as per the nature of Stokes' Law. In such, the sedimentation of the droplets of oil separates the oil from the water. The water (still contaminated with other pollutants) flows to a low spot of the collection system 10 while most of the oil remains within the plate layers 30/40. As in FIGS. 4, 5, and 6, a drain 149 at the low area of the base layer 50 permits collection of the water (with some contaminates). After some number of uses, the upper layer 20 is lifted and the oil is vacuumed out of the plate layers 30/40 for proper disposal and recycling.

Figure 3A:
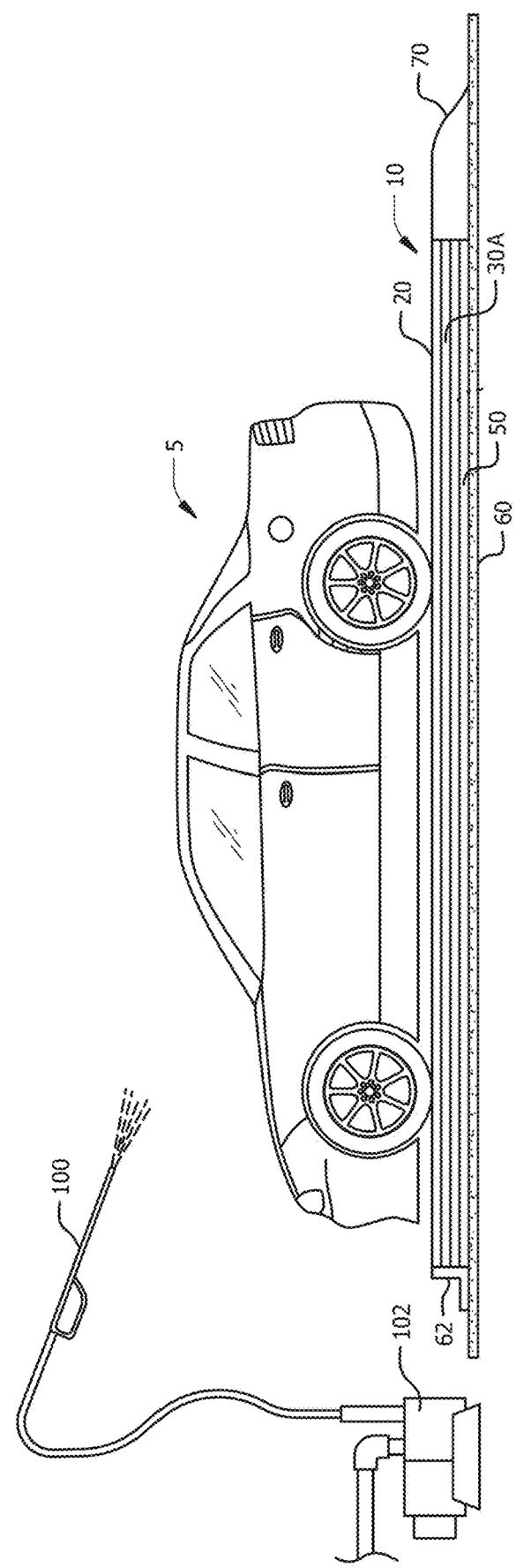
FIG. 3A illustrates a second elevational view of the waste and/or hazardous liquid containment and collection system.

Referring to FIG. 3A, a plan view of the waste and/or hazardous liquid containment and collection system 10 is shown. In this example, a ramp 70 is provided to ease driving of a vehicle 5 onto the collection system 10. For completeness, a high-pressure pump 102 and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30A/50. As the contaminated water flows traverses the plate layer 30A, any oil suspended in the water beads into droplets that further combine with existing droplets of oil and remains within the netting of the plate layer 30A as per the nature of Stokes' Law. In such, the sedimentation of the droplets of oil separates the oil from the water. The water (still contaminated with other pollutants) flows to a low spot of the collection system 10 while most of the oil remains within the plate layer 30A. As in FIGS. 4, 5, and 6, a drain 149 at the low area of the base layer 50 permits collection of the water (with some contaminates). After some number of uses, the upper layer 20 is lifted and the oil is vacuumed out of the plate layer 30A for proper disposal and recycling.

Referring to FIGS. 4, 5, and 6, alternate installations of the waste and/or hazardous liquid containment and collection system 10 are shown. In these examples of installations of the collection system 10, after removal of the oils by the plate layers 30/40 per the above explanation, the run-off, dirty water falls through a drain 149 in the base layer 50. Although not required, it is preferred that the layers 20/30/40/50 are slightly pitched towards the drain 149 to facilitate a slow flow of fluid towards the drain 149.

After falling through the drain 149, the run-off, dirty water is further processed by separation tank 150. In this exemplary separation tank 150 (see FIG. 4 for details), the dirty water enters into a first compartment 152. As the first compartment 152 fills, the now cleaner water flows over a weir 153 into a second compartment 154. In such, contaminates that have a higher specific gravity than water (e.g., sand, metal) settle to the bottom of the first compartment 152 and the water and contaminates that have a lower specific gravity than water (e.g., remaining oils, plastics) flow over the weir 153 and into the second compartment 154. In the second compartment 154, contaminates that have a lower specific gravity than water tend to float to the top 156 of the second compartment 154 while the, now, reclaimed water exits from the bottom of the second compartment 154 under a partition 157 (e.g., an inverted weir) and into an exit compartment 158, where the reclaimed water exits, for example, into the sewerage drain 200. As with the plate layers 30/40, after some number of uses, debris, soil, leaf material, sand, contaminates are vacuumed out of the compartments 152/154/158 and disposed or recycled according to accepted practices.

In FIG. 4, the reclaimed water is not recycled, entering the sewerage drain 200 or any other known waste water disposal system (not shown). In such, fresh water is supplied for cleaning the vehicle 5, for example, from a municipal water supply 110 or well and pump.

In FIG. 5, the reclaimed water exiting the separation tank 150 is gravity fed to a sump 302 through tube 300. When the sump 302 fills to a certain point, the reclaimed water from within the sump 302 is pumped out through an exit pipe 306 and is directed by a valve 304 to either the sewerage drain 200 (or other drainage system) or into filtering and separation tanks 310/320. The reclaimed water in the first separation tank 310 is preferably treated with aeration from an air pump 312. As the first separation tank 310 approaches being filled with the reclaimed water, some of the reclaimed water exits the first separation tank 310 from an upper area to exclude some amount of sedimentation, and this water passes through a filter 316, for example, a paper filter, sand filter, carbon filter, etc. The now, substantially clean water enters the second separation tank 320 which optionally has a second aeration pump 322. Should the system lose water (fluid) due to, for example, splashing, evaporation, and some water remaining on the vehicle 5, additional water is added from, for example, a municipal water supply 110 through a supply valve 324 that is used to control the amount of water that is added to the system.

Water (substantially clean water) is then drawn from the bottom of the second separation tank 320. By drawing the water from the bottom of the second separation tank 320, the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when an electronic device (e.g. a float or other device) determines that the water level in the second separation tank 320 is below a certain level.

In FIG. 6, a similar approach to further cleaning the reclaimed water is shown. The reclaimed water exits the separation tank 150 and is gravity fed to a sump 302 through a tube 300. When the sump 302 fills to a certain point, the reclaimed water from within the sump 302 is pumped out through an exit pipe 306 and is directed by a valve 304 to either the sewerage drain 200 (or other drainage system) or into filtering and separation tanks 310/320.

In this embodiment, the valve 304 directs the reclaimed water into the first separation tank 310. In some embodiments, the reclaimed water in the separation tank 310 is treated with aeration from an air pump 312. As the first separation tank 310 approaches being filled with the reclaimed water, some of the reclaimed water exits the first separation tank 310 from an upper area to exclude some amount of sedimentation that occurs in the separation tank 310. In some embodiments, this reclaimed water then passes through a filter 316, for example, a paper filter, sand filter, carbon filter, etc. The now, substantially cleaner reclaimed water enters a second separation tank 320 which, in some embodiments, has a second aeration pump 322. Should the system lose water (fluid) due to, for example, splashing, evaporation, etc., additional water is added, for example, from a municipal water supply 110 through a supply valve 324 that is used to control the amount of municipal water that is added to the system.

Water (substantially clean water) is then drawn from the second separation tank 320. In some embodiments, the water is drawn from the bottom of the second separation tank 320 and the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when an electronic device (e.g. a float or other device) determines that the water level in the second separation tank 320 is below a certain level.

In FIG. 6, an additional reverse osmosis filter system 103/104 further cleans the reclaimed water (and municipal water) from the second separation tank 320 before this water is used (e.g. to wash a vehicle or water plants). In this example, the reverse osmosis filter system 103/104 includes a bladder 103 and a pump 104, the pump 104 forcing the reclaimed water through the bladder at a rated pressure for the bladder 103. Note that the reverse osmosis filter system 103/104 is shown simplified as there are other components in a reverse osmosis filter system 103/104 that are not shown for clarity and brevity reasons. For example, many reverse osmosis filter systems 103/104 flow water over the bladder 103 to clean the bladder 103. The, now, contaminated water of such must be disposed. In the example shown in FIG. 6, the contaminated water from the reverse osmosis filter system 103/104 exits through a tube 105 and is directed to run back through the above described system, either falling on the separation portion layers 20/30/40/50 or directly into the separation tank 150, etc.

Figure 7:
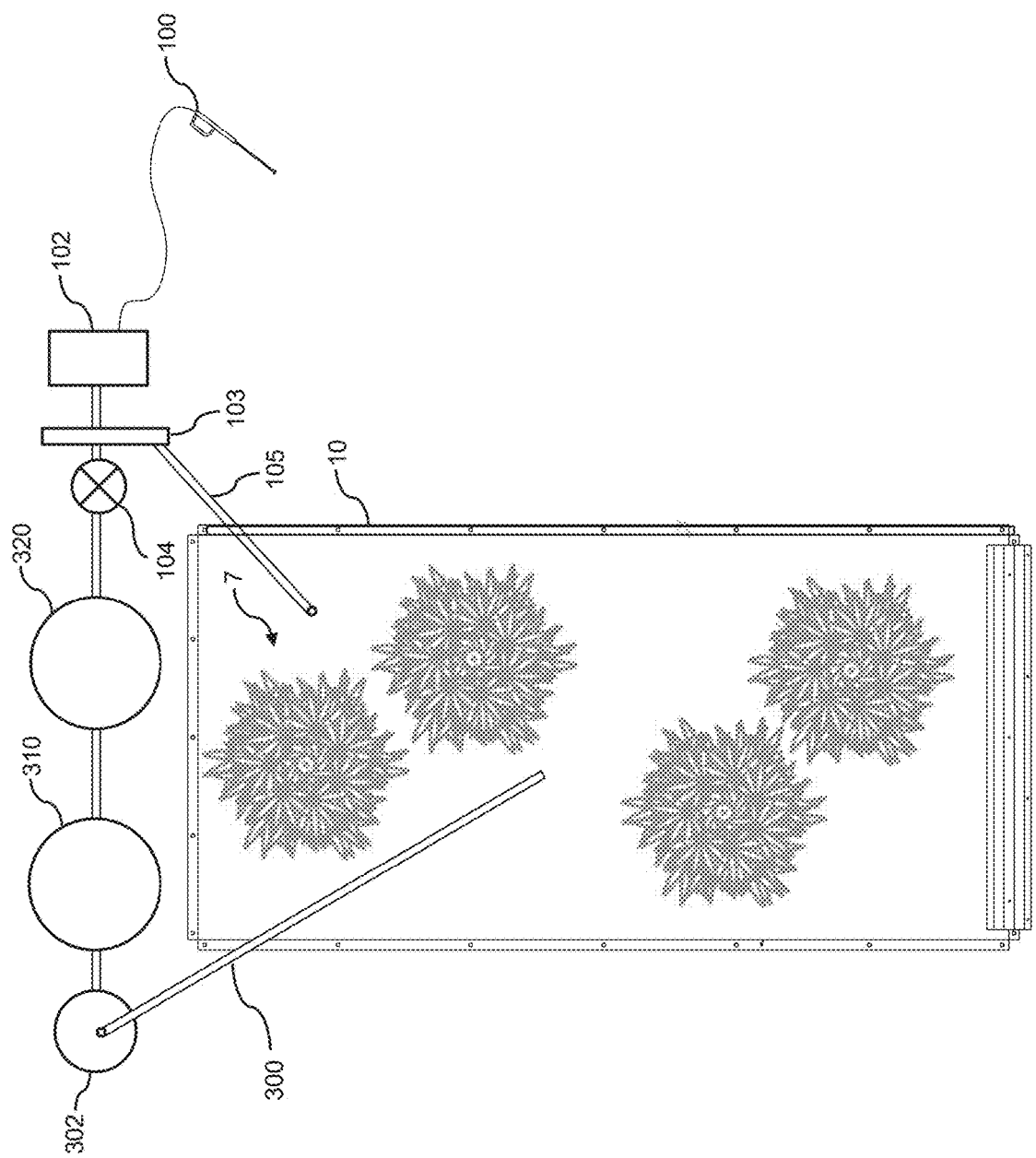
FIG. 7 illustrates a plan view of the waste and/or hazardous liquid containment and collection system in use with plants.
Figure 8:
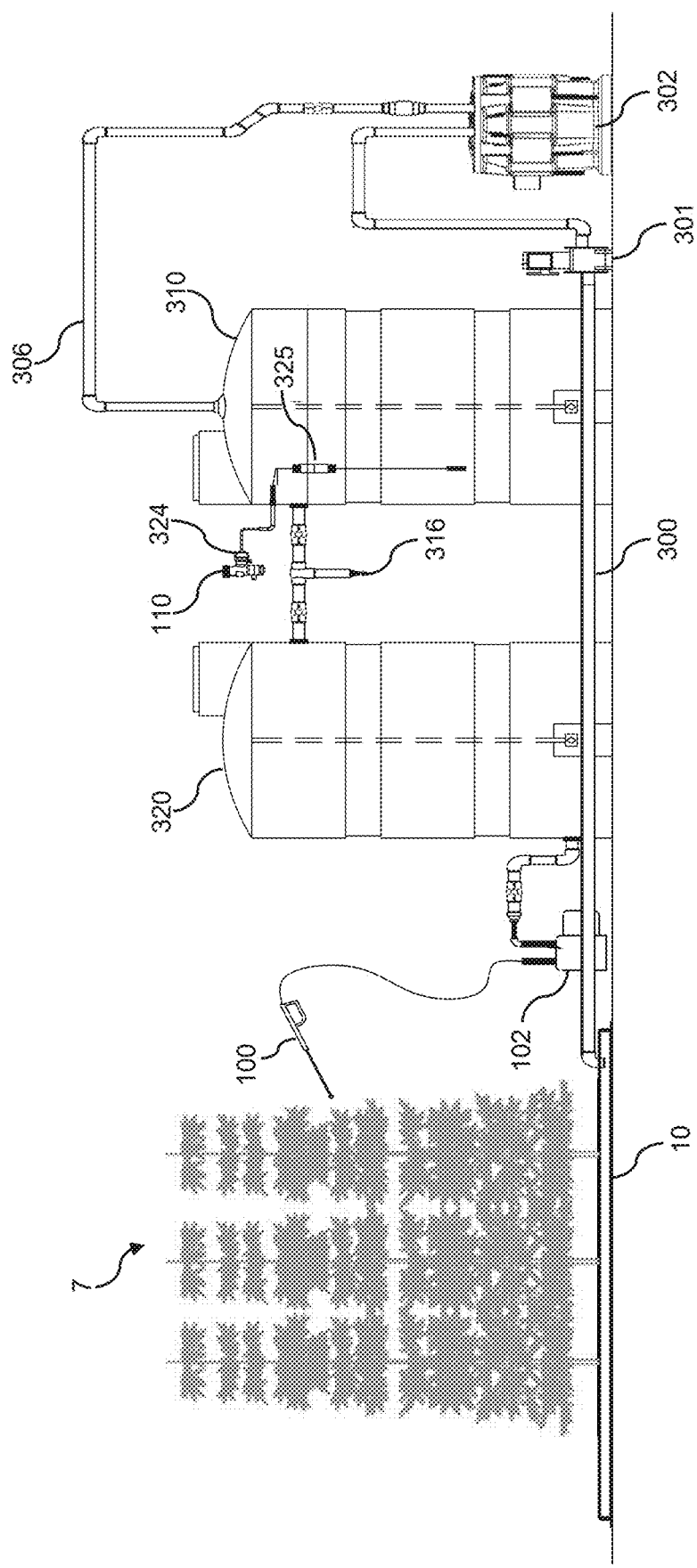
FIG. 8 illustrates a elevational view of the waste and/or hazardous liquid containment and collection system in use with plants.

In FIGS. 7 and 8, the collection system 10 is shown being used with live plants 7. Note this is shown with the optional reverse osmosis filter system 103/104 in FIG. 7 and without in FIG. 8. When present, the optional reverse osmosis filter system 103/104 further cleans the reclaimed water (and municipal water) from the second separation tank 320 before this water is used to water or wash the live plants 7.

In FIG. 7, the collection system 10 is shown with multiple plants 7. As the live plants 7 are watered or cleaned, excess water, possibly mixed with soil from runoff, leaves, etc., falls onto the collection system 10 and is pre-cleaned using the above described grid system, exiting through a tube 300 to the sump 302 (or equivalent tank), then through the first separation tank 310 and second separation tank 320, and optionally one or more filters. 316. When water is needed for further irrigation or for cleaning the live plants 7, in some embodiments, the reclaimed water is further cleaned using the optional reverse osmosis filter system 103/104.

In this example, the reverse osmosis filter system 103/104 includes a bladder 103 and a pump 104, the pump 104 forcing the reclaimed water from the second separation tank 320 through the bladder at a rated pressure for the bladder 103. Note that the reverse osmosis filter system 103/104 is shown simplified as there are other components in a reverse osmosis filter system 103/104 that are not shown for clarity and brevity reasons. For example, many reverse osmosis filter systems 103/104 flow water over the bladder 103 to clean the bladder 103. The, now, contaminated water from such must be properly disposed. In the example shown in FIG. 7, the contaminated water from the reverse osmosis filter system 103/104 exits through a tube 105 and is directed to run back through the above described system, either falling on the separation portion layers 20/30/40/50 or directly into the separation tank 150, etc.

In FIG. 8, after water from the live plants 7 falls on the collection system 10, the water is directed to the drain 149, in some embodiments, the reclaimed water is further processed by separation tank 150 (not shown in FIG. 8). Although, in some embodiments, gravity is used to transport the reclaimed water to the sump 302 (or other holding tank), in this embodiment, a pump 301 is used to move the reclaimed water from the collection system 10, through plumbing such as a tube 300, and to the sump 302.

When the sump 302 fills to a certain point, the reclaimed water from within the sump 302 is pumped out through an exit pipe 306 and into filtering and separation tanks 310/320.

As the first separation tank 310 approaches being filled with the reclaimed water, some of the reclaimed water exits the first separation tank 310 from an upper area to exclude some amount of sedimentation that occurs in the separation tank 310. In some embodiments, this reclaimed water then passes through a filter 316, for example, a paper filter, sand filter, carbon filter, etc. Should the system lose water (fluid) due to, for example, splashing, evaporation, etc., additional water is added, for example, from a municipal water supply 110 through a supply valve 324 that is used to control the amount of municipal water that is added to the system. In some embodiments, a level sensor 325 provides data regarding the fluid level within the first separation tank 310.

Reclaimed water (substantially clean water) is then drawn from the second separation tank 320. In some embodiments, the water is drawn from the bottom of the second separation tank 320 and the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when the level sensor signals that the water level in the first separation tank 310 is below a certain level.

In some embodiments, the now clean reclaimed water (and/or municipal water) is used to irrigate and/or wash the live plants 7. In some embodiments, a high-pressure pump 102 and a washing wand 100 are connected to the second separation tank 320 as, for certain live plants 7, pressure washing is performed before harvest to remove dead foliage and any foreign matter that may have settled on the live plants 7.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A liquid cleaning system for living plants, the liquid cleaning system comprising:
    a planar material for being positioned beneath the living plants for collecting a liquid, the planar material being a non-porous material except for a drain;
    a plate layer comprising at least two layers of runners arranged in a grid, the grid of each successive layer of the layers is offset at an angle with respect to the grid of a previous layer of the layers;
    the plate layer resting upon the non-porous material; and
    an upper layer covering the plate layer, the upper layer having a plurality of holes;
    wherein as the liquid is distributed to water or clean the living plants, the liquid enters the liquid cleaning system through the plurality of holes, traverses the grids of the layers of the plate layer and flows towards the drain, and contaminants within the liquid collect within the grids of the layers of the plate layer.

2. The liquid cleaning system of claim 1, in which the liquid comprises water and oils from the plants, the oils having a lower specific gravity than water get trapped in upper layer of the layers of runners and the water having less of the oils exits through the drain.

3. The liquid cleaning system of claim 1, in which the liquid comprises soil particles suspended in water, the soil particles having a higher specific gravity than water get trapped in lower layers of the layers of runners and the water having less soil particles exits through the drain.

4. The liquid cleaning system of claim 2, further comprising a separation tank fluidly connected to the drain, the separation tank further removing some of the oils that have lower specific gravities than the water by using a weir system.

5. The liquid cleaning system of claim 3, further comprising a separation tank fluidly connected to the drain, the separation tank further removing some of the soil particles that have higher specific gravities than the water by using a weir system.

6. The liquid cleaning system of claim 1, wherein the plate layer is made textured geo-membranes made by co-extruding textured, high density polyethylene.

7. The liquid cleaning system of claim 1, wherein the non-porous material is a water-resistant coating on a floor beneath the plate layer.

8. The liquid cleaning system of claim 1, wherein liquid passes through a reverse osmosis membrane before being reintroduced to the living plants for watering or cleaning.

9. A liquid cleaning system for being positioned beneath living plants, the liquid cleaning system comprising:
    a lower layer that is substantially non-porous except for a drain;
    a plate layer comprising at least two layers of runners arranged in a grid, the grid of each successive layer of the layers is offset at an angle with respect to the grid of a previous layer of the layers;
    an upper layer covering the plate layer, the upper layer having a plurality of holes for the passage of fluids; and
    walls surrounding the plate layer and the upper layer.

10. The liquid cleaning system of claim 9, wherein the plate layer is made of textured geo-membranes made by co-extruding textured, high density polyethylene.

11. The liquid cleaning system of claim 9, wherein the lower layer is made of reinforced polypropylene.

12. The liquid cleaning system of claim 9, wherein the lower layer is a water resistant coating.

13. The liquid cleaning system of claim 9, further comprising a separation tank that receives a water and oils excreted by the living plants from the drain, the separation tank further removes some of the oils that have lower specific gravities than the water by way of a weir system.

\* \* \* \* \*